(12) United States Patent
Ellis et al.

(10) Patent No.: US 9,098,399 B2
(45) Date of Patent: Aug. 4, 2015

(54) ELECTRONIC SYSTEM WITH STORAGE MANAGEMENT MECHANISM AND METHOD OF OPERATION THEREOF

(75) Inventors: Robert W. Ellis, Phoenix, AZ (US); James Fitzpatrick, Sudbury, MA (US); James Higgins, Chandler, AZ (US)

(73) Assignee: SMART STORAGE SYSTEMS, INC., Milpitas, CA (US)

( * ) Notice: Subject to any disclaimer, the term of this patent is extended or adjusted under 35 U.S.C. 154(b) by 30 days.

(21) Appl. No.: 13/590,826

(22) Filed: Aug. 21, 2012

(65) Prior Publication Data

US 2013/0054881 A1 Feb. 28, 2013

Related U.S. Application Data

(60) Provisional application No. 61/529,913, filed on Aug. 31, 2011.

(51) Int. Cl.
| | |
|---|---|
| *G06F 12/00* | (2006.01) |
| *G06F 3/00* | (2006.01) |
| *G06F 12/02* | (2006.01) |
| *G06F 3/06* | (2006.01) |

(52) U.S. Cl.
CPC .......... *G06F 12/0246* (2013.01); *G06F 3/0605* (2013.01); *G06F 3/067* (2013.01); *G06F 3/0647* (2013.01); *G06F 2212/7205* (2013.01)

(58) Field of Classification Search
USPC ........................................................ 711/165
See application file for complete search history.

(56) References Cited

U.S. PATENT DOCUMENTS

| | | | |
|---|---|---|---|
| 4,048,481 | A | 9/1977 | Bailey, Jr. et al. |
| 4,839,587 | A | 6/1989 | Flatley et al. |
| 5,034,744 | A | 7/1991 | Obinata |
| 5,210,854 | A | 5/1993 | Beaverton et al. |
| 5,311,395 | A | 5/1994 | McGaha et al. |
| 5,450,354 | A | 9/1995 | Sawada et al. |
| 5,479,638 | A | 12/1995 | Assar et al. |
| 5,784,174 | A | 7/1998 | Fujino et al. |
| 5,790,828 | A | 8/1998 | Jost |
| 5,930,504 | A | 7/1999 | Gabel |
| 5,949,785 | A | 9/1999 | Beasley |
| 5,963,983 | A | 10/1999 | Sakakura et al. |
| 6,069,827 | A | 5/2000 | Sinclair |

(Continued)

FOREIGN PATENT DOCUMENTS

| | | | |
|---|---|---|---|
| EP | 1 956 489 A2 | 8/2008 | |
| EP | 1 990 921 A2 | 11/2008 | |

(Continued)

OTHER PUBLICATIONS

Cooke, "Introduction to Flash Memory (T1A)," Flash Memory Summit, Aug. 22, 2008, Micron Technology, Inc., 102 pages.

(Continued)

*Primary Examiner* — Matthew Bradley
*Assistant Examiner* — Craig Goldschmidt
(74) *Attorney, Agent, or Firm* — Morgan, Lewis & Bockius LLP

(57) ABSTRACT

A method of operation of an electronic system includes: forming a superblock by organizing an erase block according to a wear attribute; detecting a trigger count of the wear attribute of the superblock; updating a metadata table with the trigger count; and triggering a recycling event of the superblock based on the metadata table.

18 Claims, 5 Drawing Sheets

(56) References Cited

U.S. PATENT DOCUMENTS

| | | | |
|---|---|---|---|
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,979,614 B1 | 7/2011 | Yang |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |
| 8,254,172 B1* | 8/2012 | Kan ............... 365/185.12 |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,601,203 B2 | 12/2013 | Holbrook et al. |
| 8,612,804 B1* | 12/2013 | Kang et al. ............... 714/42 |
| 8,661,184 B2 | 2/2014 | Wood et al. |
| 8,832,506 B2 | 9/2014 | Griffin et al. |
| 2002/0056025 A1 | 5/2002 | Qiu et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 | 5/2004 | Bacon et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 | 6/2005 | Gonzalez et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1* | 3/2007 | Faber ............... 711/113 |
| 2007/0067598 A1 | 3/2007 | Fujimoto |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0126720 A1 | 5/2008 | Danilak |
| 2008/0183918 A1 | 7/2008 | Dhokia et al. |
| 2008/0189588 A1 | 8/2008 | Tanaka et al. |
| 2008/0313505 A1 | 12/2008 | Lee et al. |
| 2009/0006900 A1 | 1/2009 | Lastras-Montano et al. |
| 2009/0019321 A1 | 1/2009 | Radke |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |
| 2009/0125670 A1 | 5/2009 | Keays |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0164710 A1 | 6/2009 | Choi et al. |
| 2009/0172262 A1 | 7/2009 | Olbrich et al. |
| 2009/0179707 A1 | 7/2009 | Higashino |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0300238 A1 | 12/2009 | Panabaker et al. |
| 2009/0323419 A1* | 12/2009 | Lee et al. ............... 365/185.11 |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0165689 A1 | 7/2010 | Rotbard et al. |

(56) References Cited

U.S. PATENT DOCUMENTS

| | | |
|---|---|---|
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1* | 11/2010 | Feldman et al. .............. 711/103 |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1 | 3/2011 | Lin |
| 2011/0099342 A1 | 4/2011 | Ozdemir |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0209032 A1 | 8/2011 | Choi et al. |
| 2011/0238892 A1 | 9/2011 | Tsai et al. |
| 2011/0239088 A1 | 9/2011 | Post |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0170365 A1 | 7/2012 | Kang et al. |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0254686 A1 | 10/2012 | Esumi et al. |
| 2012/0266048 A1 | 10/2012 | Chung et al. |
| 2012/0278530 A1 | 11/2012 | Ebsen |
| 2012/0284587 A1 | 11/2012 | Yu et al. |
| 2012/0297113 A1 | 11/2012 | Belluomini et al. |
| 2012/0311402 A1 | 12/2012 | Tseng et al. |
| 2012/0324191 A1 | 12/2012 | Strange et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0073788 A1 | 3/2013 | Post et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0238833 A1 | 9/2013 | Vogan et al. |
| 2013/0265825 A1 | 10/2013 | Lassa |
| 2013/0332791 A1 | 12/2013 | Chu |
| 2014/0108891 A1 | 4/2014 | Strasser et al. |
| 2014/0129874 A1 | 5/2014 | Zaltsman et al. |
| 2014/0208174 A1 | 7/2014 | Ellis et al. |

FOREIGN PATENT DOCUMENTS

| | | |
|---|---|---|
| EP | 2 498 259 A2 | 9/2012 |
| JP | 2012129859 A | 7/2012 |
| WO | WO 2009/042298 A1 | 4/2009 |
| WO | WO 2011/156466 | 12/2011 |

OTHER PUBLICATIONS

Gal et al., "Algorithms and Data Structures for Flash Memories," ACM Computing Surveys, Jun. 2005, vol. 37, No. 2, 30 pages.

IBM Corporation, "Systems Management, Work Management," Version 5, Release 4, 9th Edition, Feb. 2006 pp. 1-21.

O'Brien, "SMART Storage Systems Optimus SAS Enterprise SSD Review," SMART Storage Systems, Oct. 9, 2012, 44 pages.

Spanjer, "Flash Management—Why and How?" Smart Modular Technologies, Nov. 2009, http://www.scantec.de/fileadmin/pdf/Smart_Modular/Flash-Management.pdf, 14 pages.

Texas Instruments, "Power Management IC for Digital Set Top Boxes," SLVSA10A, Sep. 2009, pp. 1-22.

International Search Report and Written Opinion dated Dec. 20, 2013, received in PCT/US2013/045282, which corresponds to U.S. Appl. No. 13/493,949, 7 pages (Ellis).

International Search Report and Written Opinion dated Aug. 22, 2014, received in International Patent Application No. PCT/US2014/032978, which corresponds to U.S. Appl. No. 14/081,992, 10 pages (Ellis).

International Search Report and Written Opimon dated Nov. 7, 2014, received in International Patent Application No. PCT/US2014/049732, which corresponds to U.S. Appl. No. 14/334,350, 13 pages (Fitzpatrick).

International Search Report and Written Opinion dated Oct. 17, 2014, received in International Patent Application No. PCT/US2014/049734, which corresponds to U.S. Appl. No. 14/332,259, 8 pages (Higgins).

International Search Report and Written Opinion dated Oct. 23, 2014, received in International Patent Application No. PCT/US2014/049736, which corresponds to U.S. Appl. No. 14/446,249 8 pages (Fitzpatrick).

International Search Report and Written Opinion dated Nov. 5, 2014, received in International Patent Application No. PCT/US2014/049282, which corresponds to U.S. Appl. No. 13/957,407, 12 pages (Fitzpatrick).

Tseng et al., "Understanding the Impact of Power Loss on Flash Memory," DAC'11, Jun. 5-10, 2011, San Diego, California, 6 pages.

Ulinktech, "ATA Command Table (in Alphabetic Order)," Feb. 6, 2011, https://web.archive.org/web/20110206060820/http://www.ulinktech.com/downloads/AT, 6 pages.

International Search Report and Written Opinion dated May 14, 2014, received in International Patent Application No. PCT/US2014/017168, which corresponds to U.S. Appl. No. 14/076,115, 6 pages (Fitzpatrick).

International Search Report and Written Opinion dated May 14, 2014, received in International Patent Application No. PCT/US2014/017169, which corresponds to U.S. Appl. No. 14/076,148, 6 pages (Fitzpatrick).

International Search Report dated Mar. 25, 2014, received in International Patent Application No. PCT/US2013/072400, which corresponds to U.S. Appl. No. 13/690,337, 3 pages (Ellis).

International Search Report and Written Opinion dated Jun. 12, 2014, received in International Patent Application No. PCT/US2014/018972, which corresponds to U.S. Appl. No. 13/779,352, 12 pages (Schmier).

Invitation to Pay Additional Fees dated Jul. 25, 2014, received in International Patent Application No. PCT/US2014/021290, which corresponds to U.S. Appl. No. 13/791,797, 8 pages (Dean).

International Search Report and Written Opinion dated Jul. 31, 2014, received in International Patent Application No. PCT/US2014/031465, which corresponds to U.S. Appl. No. 13/851,928, 13 pages (Ellis).

International Search Report and Written Opinion dated Jul. 31, 2014, received in International Patent Application No. PCT/US2014/033876, which corresponds to U.S. Appl. No. 13/861,326, 9 pages (Fitzpatrick).

(56) References Cited

OTHER PUBLICATIONS

Narayanan et al., "Migrating Server Storage to SSDs: Analysis of Tradeoffs," Computer Systems, Apr. 2009, 12 pages.

Shiraz et al., "Block Aging Prevention Technique (BAP) for Flash Based Solid State Disks," 7th International Conference on Emerging Technologies (ICET), Sep. 5, 2011, 6 pages.

Tai et al., "Prolongation of Lifetime and the Evaluation Method of Dependable SSD" 25 International Symposium on Defect and Fault Tolerance in VLSI Systems, 2010, NJ, USA, 8 pages.

Yimo et al., "WeLe-RAID: A SSD-Based RAID for System Endurance and Performance," Jan. 2011, Network and Parallel Computing, Springer, 14 pages.

International Search Report and Written Opinion dated Jun. 9, 2015, received in International Patent Application No. PCT/US2014/049731, which corresponds to U.S. Appl. No. 14/334,324, 9 pages (Fitzpatrick).

International Search Report and Written Opinion dated Feb. 18, 2015, received in International Patent Application No. PCT/US2014/065401, which corresponds to U.S. Appl. No. 14/082,031, 9 pages (Higgins).

International Search Report dated Apr. 15, 2014, received in International Patent Application No. PCT/US2013/078340, which corresponds to U.S. Appl. No. 13/746,542, 11 pages (Ellis).

\* cited by examiner

ELECTRONIC SYSTEM WITH STORAGE MANAGEMENT MECHANISM AND METHOD OF OPERATION THEREOF

CROSS-REFERENCE TO RELATED APPLICATION

This application claims the benefit of U.S. Provisional Patent Application Ser. No. 61/529,913 filed Aug. 31, 2011, and the subject matter thereof is incorporated herein by reference thereto.

TECHNICAL FIELD

The present invention relates generally to an electronic system and more particularly to a system with storage management.

BACKGROUND ART

All electronic systems require some form of memory or storage. Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. One of these is flash Electrically Erasable Programmable Read-Only Memory (EEPROM). Flash EEPROM memory includes a plurality of floating-gate field effect transistors arranged as memory cells. NAND flash is one form of non-volatile memory used in solid state storage devices. The memory cells are arranged in typical row and column fashion with circuitry for accessing individual cells. The memory transistors of those cells can store an analog value that can be interpreted to hold two logical states for Single Level Cell (SLC) or more than two logical states as for Multi Level Cells (MLC).

A flash memory cell, like a typical EEPROM cell but in contrast to Dynamic random-access memory (DRAM) memory, retains information when power is removed. Flash EEPROM memory has a number of characteristics, which adapt it to use as long-term memory. It is light in weight, occupies very little space, and consumes less power than electromechanical disk drives. Construction of a storage system with this type of memory allows for much higher bandwidth and higher input output operations per second than a typical electromechanical disk drive. More importantly, it is especially rugged and can operate at a much high temperature range. It will withstand, without adverse effects, repeated drops, each of which would destroy a typical electromechanical hard disk drive. A problem exhibited by flash memory is that it tends to have a limited life in use.

Thus, a need still remains for better storage management to prolong the performance and durability of electronic systems. In view of the increasing demand for storage management of electronic systems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an electronic system, including: forming a superblock by organizing an erase block according to a wear attribute; detecting a trigger count of the wear attribute of the superblock; updating a metadata table with the trigger count; and triggering a recycling event of the superblock based on the metadata table.

The present invention provides an electronic system, including: a block module for forming a superblock by organizing an erase block according to a wear attribute; a table module, coupled to the block module, for detecting a trigger count of the wear attribute of the superblock; an update module, coupled to the table module, for updating a metadata table with the trigger count; and a recycle module, coupled to the update module, for triggering a recycling event of the superblock based on the metadata table.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
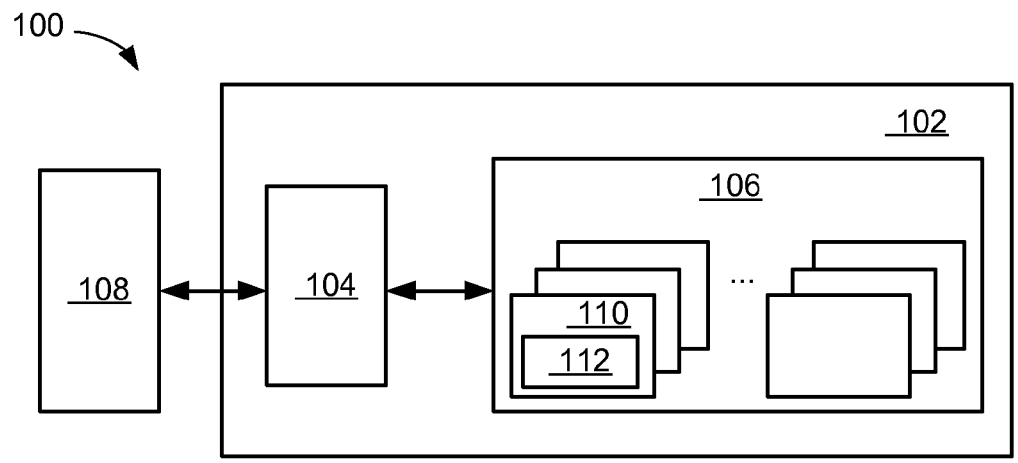
FIG. 1 is an electronic system with storage management mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include hardware, software running on or coupled to hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including but not limited to temperature sensors, or a combination thereof.

Referring now to FIG. 1, therein is shown an electronic system 100 with storage management mechanism in an embodiment of the present invention. The electronic system 100 includes a memory sub-system 102 having a memory controller 104 and a memory array 106. The electronic system 100 includes a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 includes an array of memory devices 110 including flash memory devices or non-volatile memory devices. The memory array 106 can include pages of data or information. The host system 108 can request the memory controller 104 for reading, writing, and deleting data from or to the logical address space of the storage device that includes the memory array 106.

The memory devices 110 can include chip selects 112, which are defined as control inputs, for enabling the memory devices 110. Each of the chip selects 112 can be used to control the operation of one of the memory devices 110. When the chip selects 112 are enabled, the memory devices 110 are in active state for operation including reading, writing, or recycling. This is also true for sub addresses LUNs (logical units) within a device controlled by one chip select.

Figure 2:
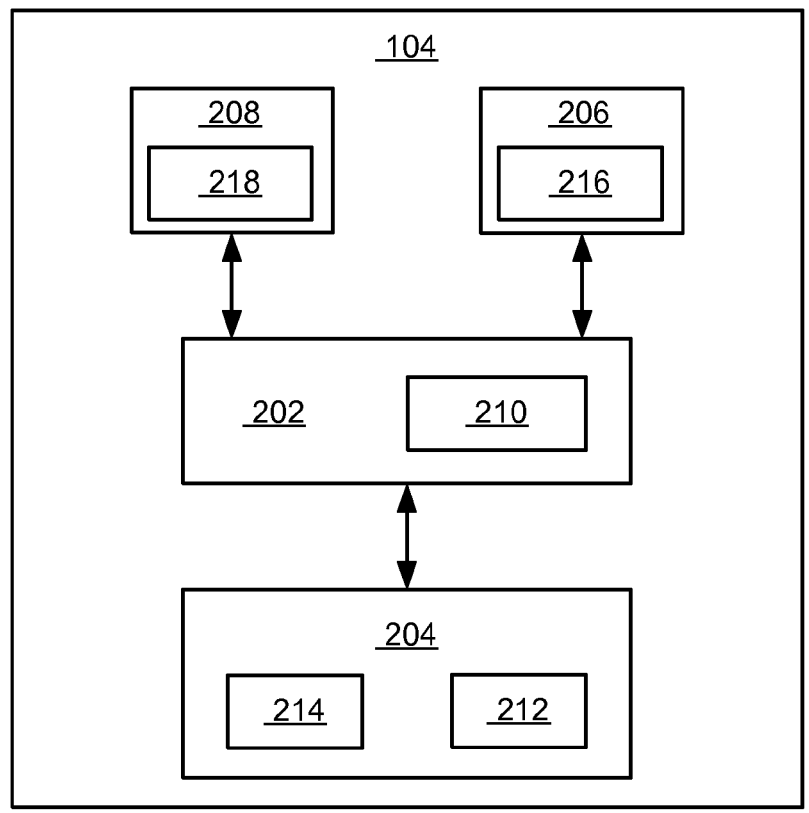
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with dedicated hardware such is an application-specific integrated circuit (ASIC), configurable hardware such as an FPGA (Field programmable Gate Array), discrete electronic hardware, or a combination thereof.

The storage unit 204 can include hardware, control firmware, and the software 212. The storage unit 204 can contain a volatile memory, a non-volatile memory, an internal memory, an external memory, or a combination thereof. For example, the storage unit 204 can be a non-volatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Figure 3:
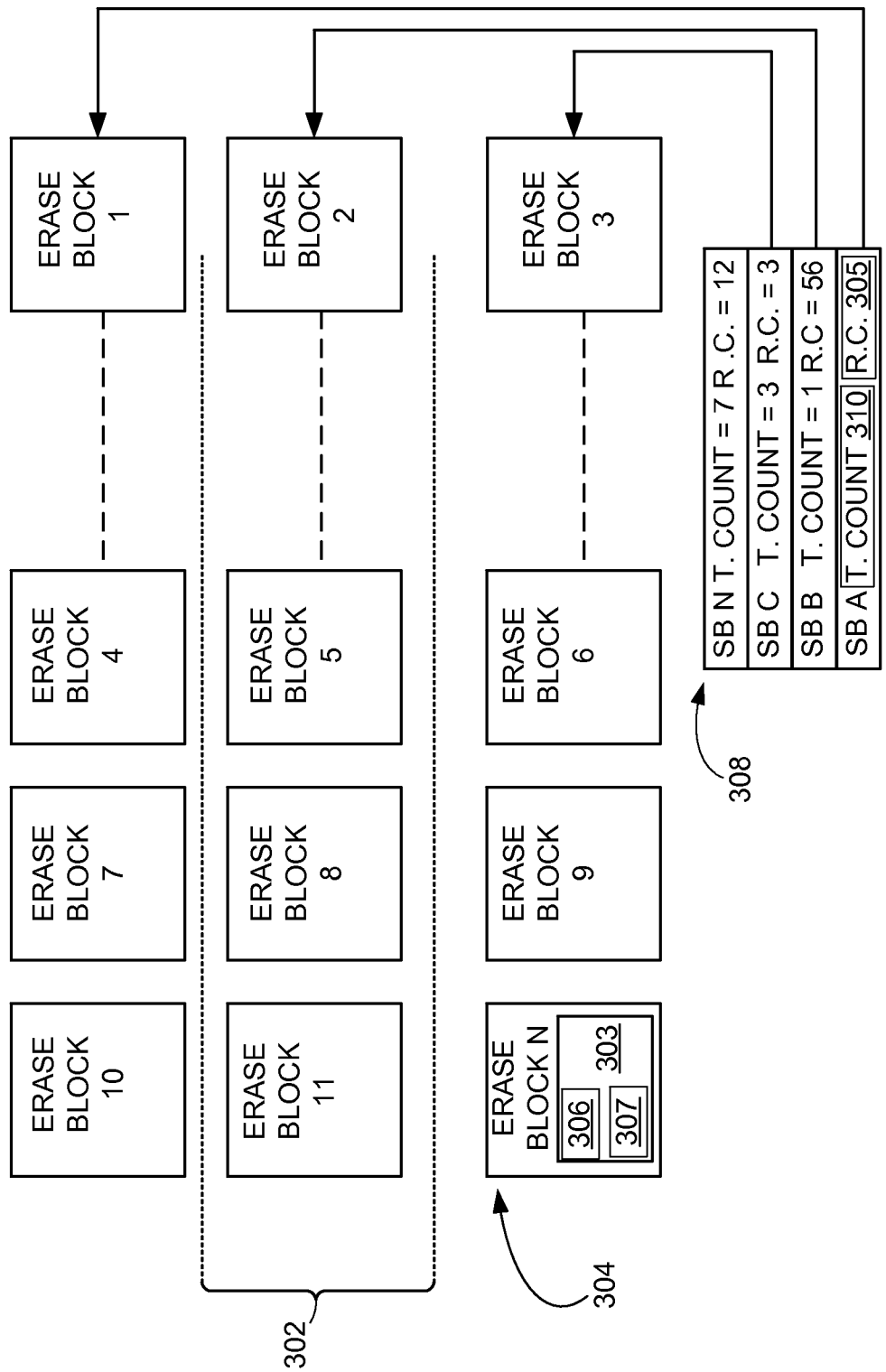
FIG. 3 is an example diagram of the storage management for the electronic system of FIG. 1.

Referring now to FIG. 3, therein is shown an example diagram of the storage management for the electronic system 100 of FIG. 1. The example includes erase blocks 304 of non-volatile memory in the memory array 106 of FIG. 1. The portion of the erase blocks 304 are grouped into a superblock 302 and the example also includes multiple superblocks.

The superblock 302 is defined as a grouping of some of the erase blocks 304. The superblock 302 can be a virtual or logical grouping of the erase blocks 304. The memory controller 104 of FIG. 1 can manage data on a superblock level, instead of an individual erase block level to reduce the volume of information that needs to be tracked to manageable levels. The organization of the superblock 302 can be based on groupings of the erase blocks 304 based on a wear attribute 303. The organization of the superblock 302 can be based on age characteristics, use models that support various types of retention strategy, or a combination thereof. The superblock 302 will be explained in further detail below.

The wear attribute 303 is defined as a characteristic of the erase blocks 304 that degrades the reliability of the erase blocks 304 to retain information. For example, the wear attribute 303 of the erase blocks 304 can include a read count 305, a write age 306, and a leakage 307. The wear attribute 303 can also include an amount of bit errors of the erase blocks 304 as another characteristic that degrades the reliability of the erase blocks 304 to retain information.

The read count 305 is a value of a number of reads for one of the erase blocks 304. The read count 305 indicates the relative age of one of the erase blocks 304. The read count 305 can also be used to indicate the relative retention age or the relative read disturb age for one of the erase blacks 304. The read count 305 can be reset if the erase blocks 304 in the superblock 302 are recycled by an erase/write verification cycle.

The write age 306 refers to the endurance of the erase blocks 304 and is the number of times the erase blocks 304 has been erased and rewritten. The write age 306 accumulates during the life span of the erase blocks 304. The leakage 307 of the erase blocks 304 refers to the retention characteristics of the erase blocks 304 and is the loss of electric charge over time. The leakage 307 of the erase blocks 304 can be resent after recycling of the superblock 302.

The electronic system 100 can include a condition table 308. The condition table 308 is defined as a record for tracking information and metadata of the superblock 302 across power cycles. For example, the condition table 308 can be a record of the wear attribute 303. The condition table 308 can be generated before the electronic system 100 is powered off and the condition table 308 can be stored in non-volatile memory. The condition table 308 can include a trigger count 310. The condition table 308 will be explained in further detail below.

The trigger count 310 is defined as a value for one of the erase blocks 304 having the highest value for the wear attribute 303 in the superblock 302. For example, the trigger count 310 can be the value of the read count 305 of one of the erase blocks 304 in the superblock 302 with the highest value. The trigger count 310 can also represent the value of the erase blocks 304 with the highest value for the write age 306 or the leakage 307.

The trigger count 310 is a value that can trigger the recycling of the superblock 302. The trigger count 310 can be associated with a value for the read count 305, the write age 306, and the leakage 307. A single value for the trigger count 310 can represent all of the erase blocks 304 within the superblock 302 because recycling occurs on a superblock level. If the superblock 302 has undergone an erase/write verify cycle, the trigger count 310 for the read count 305 and the leakage 307 can be reset.

Figure 4:
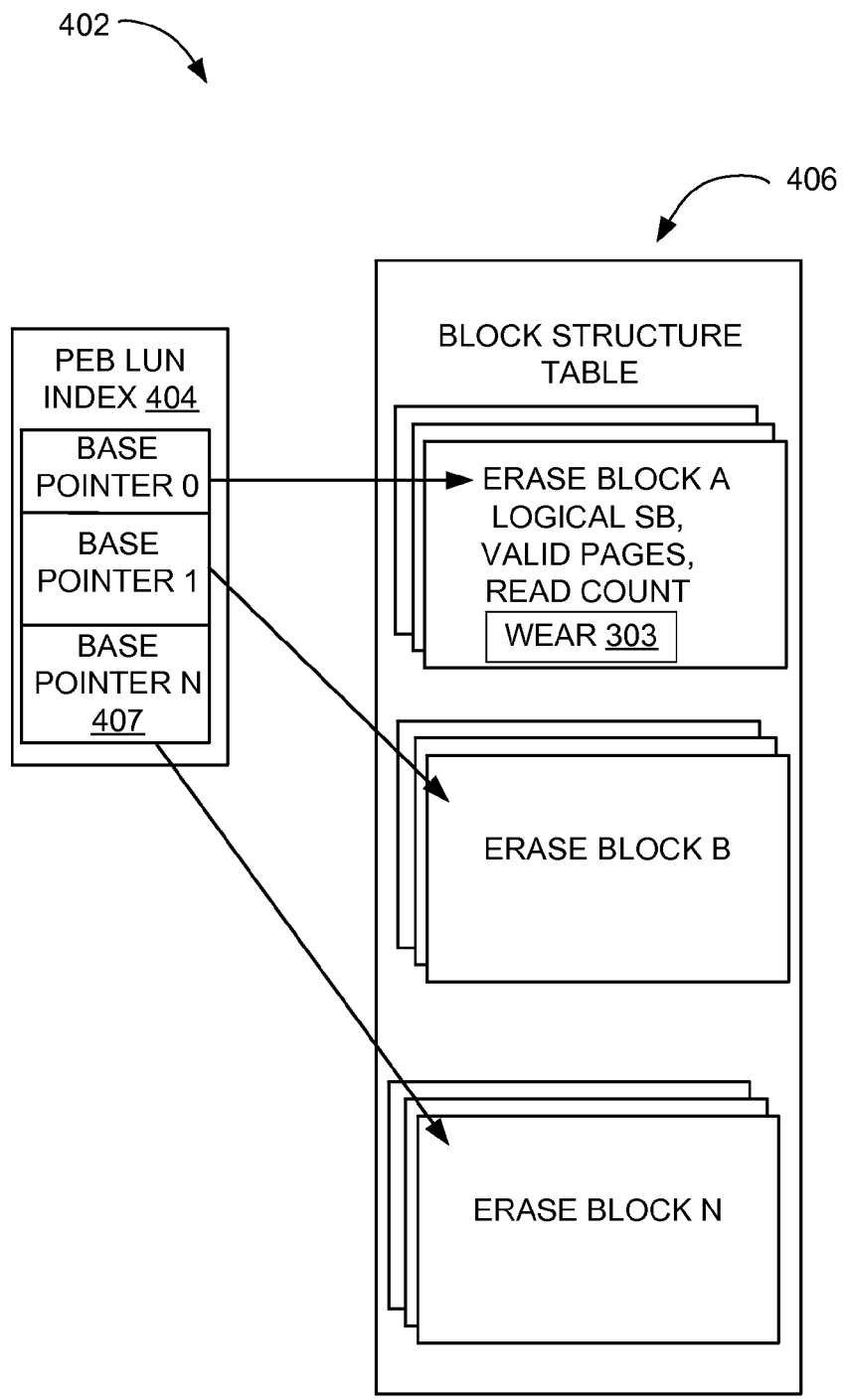
FIG. 4 is a block diagram of a metadata table of the electronic system of FIG. 1.

Referring now to FIG. 4, therein is shown a block diagram of a metadata table 402 of the electronic system 100 of FIG. 1. The metadata table 402 is defined as a record including data structures, tables, and indexes of the memory array 106 of FIG. 1. The metadata table 402 stores information associated with the physical and logical attributes of the memory array 106. For example, the metadata table 402 can include a record of the wear attribute 303.

The metadata table 402 includes tabling infrastructure and linkages of metadata of the superblock 302 of FIG. 3. During operation of the electronic system 100, the metadata table 402 can be updated by changes made to the superblock 302 including changes to the wear attribute 303 of the erase blocks 304 of FIG. 3. The metadata table 402 can include a program erase block index 404 and a block table 406.

The program erase block index 404 is defined as an index for mapping the logical unit number of blocks to the physical address within the non-volatile memory structure. The program erase block index 404 can be stored on the storage unit 204 of FIG. 2 and can be modified by the memory controller 104 of FIG. 1.

The program erase block index 404 can include a base pointer 407 associated with each of the erase blocks 304 of the non-volatile memory. For example, "base pointer 0" can provide an index for linking a logical unit number to the physical address of the first of the erase blocks 304 in the superblock 302. During recycling, if another one of the erase blocks 304 is assigned to the superblock 302, the program erase block index 404 can be updated with the new physical address of the new spare block. The program erase block index 404 can include an N number of the base pointer 407 to index the erase blocks 304.

The block table 406 records information regarding the metadata of the erase blocks 304 of the superblock 302. The block table 406 can also include the wear attribute 303 of the erase blocks 304 within the superblock 302. The block table 406 can also include a valid page count and a logical number for the superblock 302.

The metadata table 402 can be stored on the storage unit 204 and can be modified by the memory controller 104. During operation of the electronic system 100, the metadata table 402 can be copied and modified in volatile memory, such as random access memory (RAM).

Figure 5:
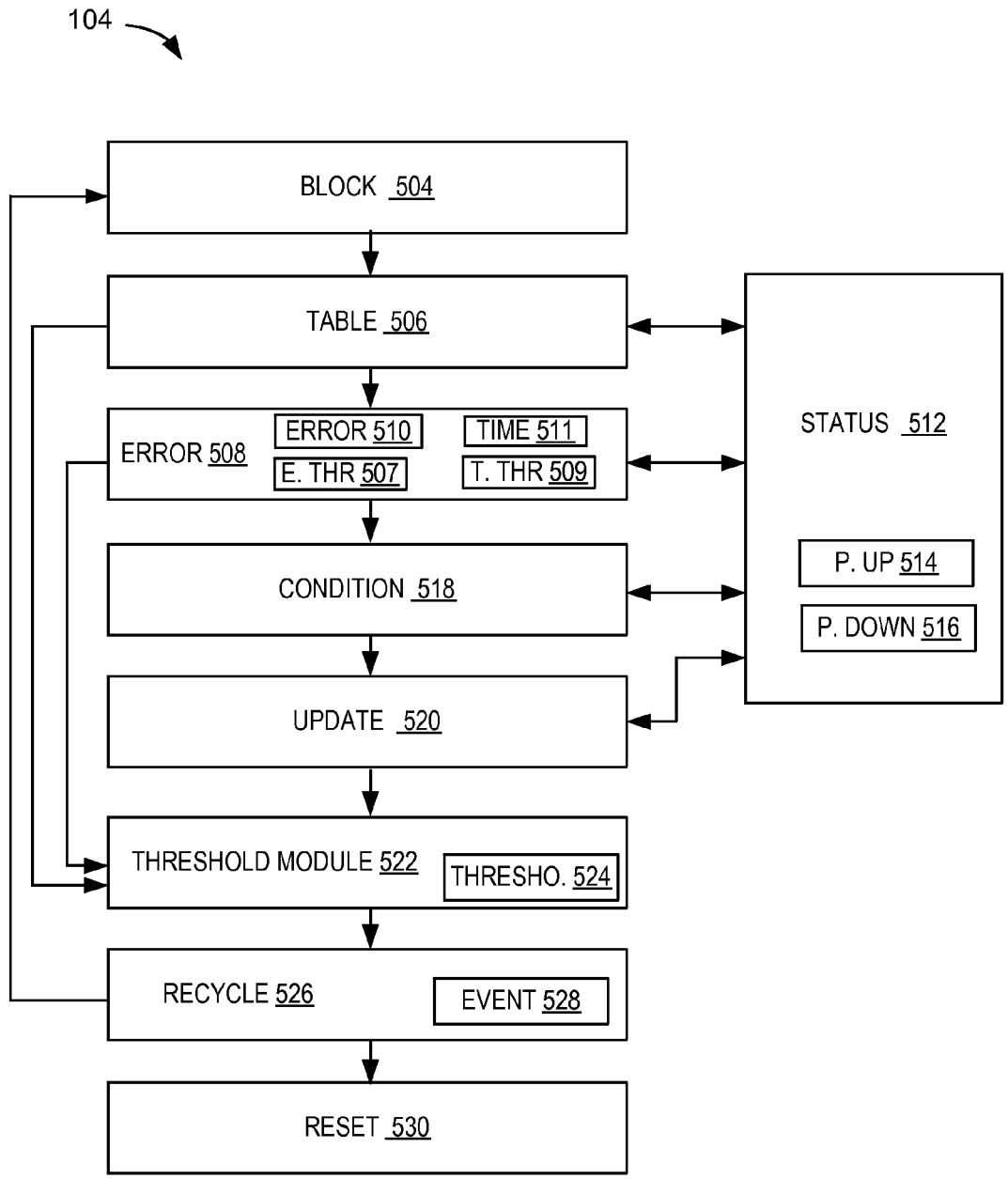
FIG. 5 is a control flow of the memory controller of FIG. 2.

Referring now to FIG. 5, therein is shown a control flow of the memory controller 104 of FIG. 2. The memory controller 104 can include a block module 504, a table module 506, an error module 508, a status module 512, a condition module 518, an update module 520, a threshold module 522, a recycle module 526, and a reset module 530.

In the control flow, as an example, each module is indicated by a number and successively higher module numbers follow one another. Control flow can pass from one module to the next higher numbered module unless explicitly otherwise indicated. The memory controller 104 can execute the block module 504, the table module 506, the error module 508, the status module 512, the condition module 518, the update module 520, the threshold module 522, the recycle module 526, and the reset module 530.

The block module 504 forms the superblock 302 of FIG. 3 from the erase blocks 304 of FIG. 3. For example, the superblock 302 can be modified and organized after a program/erase verification cycle of recycling. During recycling, the erase blocks 304 having errors caused by the wear attribute 303 of FIG. 3 can be replaced with a spare block from the erase blocks 304.

The superblock 302 can be arranged with the erase blocks 304 having similar characteristics of the wear attribute 303. For example, the erase blocks 304 in the superblock 302 can have a similar value for the write age 306 of FIG. 3. Organizing the erase blocks 304 by the superblock 302 can maintain a grouping of the erase blocks 304 having similar relative age, endurances, and retention characteristics because the erase blocks 304 are written and erased together on a superblock level.

For example, one of the erase blocks 304 with the highest value for the read count 305 of FIG. 3 can be the trigger count 310 of FIG. 3 for the superblock 302. The trigger count 310 can cause the recycling of the superblock 302 with all of the erase blocks 304 in the superblock 302 recycled together. Another example includes arranging the erase blocks 304 by minimal divergence in bit error rates per page for the superblock 302. For example, the erase blocks 304 of the superblock 302 can be arranged by a bit error rate of increments of 25. The erase blocks 304 in the superblock 302 can include a bit error rate of 0-25, 26-50, and 125-150 as examples. The block module 504 can be coupled to the table module 506 for sharing information.

The table module 506 modifies the metadata table 402 of FIG. 4. The table module 506 can modify the metadata table 402 for updating the tabling infrastructure and linkages of changes to the erase blocks 304 in the superblock 302. The table module 506 can also identify the trigger count 310 of the superblock 302 from one of the erase blocks 304 with the highest value for the wear attribute 303.

The trigger count 310 can include different values of the read count 305, the write age 306, and the leakage 307 of FIG. 3 from different examples of the erase blocks 304 of the superblock 302. For example, the table module 506 can identify one of the erase blocks 304 having the highest value for the read count 305 and also identify one of the erase blocks 304 having the highest value for the leakage 307.

The table module 506 can record the trigger count 310 of the superblock 302 for the read count 305, the write age 306, and the leakage 307 in the metadata table 402. The table module 506 can be coupled to the update module 520 for updating the metadata table 402 with the trigger count 310.

The metadata table 402 can be copied and modified in volatile memory such as RAM. The wear attribute 303 of each of the erase blocks 304 can also be tracked. The table module 506 can also track metadata on a superblock level to reduce the volume of information monitored to reduced and more manageable levels. For example, the erase blocks 304 are not recycled individually but recycled as the superblock 302. The table module 506 can be coupled to the error module 508 and the threshold module 522 for sharing information.

The error module 508 detects a bit error count 510 in the erase blocks 304 in the superblock 302. The bit error count 510 is defined as an amount of bit errors detected from one of the erase blocks 304. For example, the error module 508 can detect bit errors in the superblock 302 of one or more of the erase blocks 304 as a numerical value for the bit error count 510. The bit error count 510 can include a number associated with the bit error rate. If the bit error count 510 for the data stored on the erase blocks 304 exceeds a tolerable error threshold 507, the error module 508 can request recycling of the superblock 302. The wear attribute 303 can include the bit error count 510 as a characteristic of the erase blocks 304 that degrades reliability in retaining information.

The error module 508 can also detect a program time 511 of the erase blocks 304. The program time 511 is defined as the amount of time needed to write information to one of the erase blocks 304. If the program time 511 exceeds a tolerable time threshold 509, the error module 508 can request recycling of the superblock 302. The error module 508 can be coupled to the status module 512 and the threshold module 522.

The status module 512 detects a power up 514 and a power down 516 of the electronic system 100 of FIG. 1. For example, if the power down 516 of the electronic system 100 is detected, the memory controller 104 can save information and metadata to the condition table 308 of FIG. 3. Further, if the power up 514 is detected, the memory controller 104 can access the condition table 308 from non-volatile memory. The status module 512 can be coupled to the table module 506, the error module 508, the condition module 518, and the update module 520 for sharing information.

The condition module 518 generates the condition table 308. The condition module 518 records the trigger count 310 of the wear attribute 303 to the condition table 308 for each of the superblock 302. The condition module 518 can save the condition table 308 in non-volatile memory, such as in the storage unit 204 of FIG. 2, an external non-volatile memory, or a combination thereof. The condition module 518 can be coupled to the update module 520 for sharing information.

The update module 520 updates the metadata table 402. For example, during operation of the electronic system 100, the update module 520 can update the metadata table 402 with the trigger count 310 of the superblock 302.

The update module 520 can also update the metadata table 402 with information from the condition table 308. The update module 520 can detect the power up 514 of the electronic system 100 and update the metadata table 402 with the condition table 308. The condition table 308 including the trigger count 310 of the superblock 302 can be copied to the metadata table 402. The metadata table 402 can be updated with the condition table 308 instead of detecting the trigger count 310 from each of the superblock 302 in the memory array 106 of FIG. 1.

The update module 520 can also retrieve the condition table 308 from the non-volatile memory. The update module 520 can retrieve the condition table 308 from the non-volatile memory during the power up 514. The update module 520 can be coupled to the threshold module 522 for sharing information.

The threshold module 522 compares the bit error count 510, the program time 511, or the trigger count 310 with a recycle threshold 524. The recycle threshold 524 is defined as a minimum value that will trigger an erase/write verify cycle for recycling the superblock 302. The recycle threshold 524 can be a different value for the bit error count 510, the program time 511, and the trigger count 310.

The threshold module 522 can monitor the bit error count 510, the program time 511, and the trigger count 310 of the wear attribute 303. If the bit error count 510, the program time 511, or the trigger count 310 meet or exceed the recycle threshold 524, the threshold module 522 can request recycling of the superblock 302.

For example, the threshold module 522 can detect that the trigger count 310 for the superblock 302 that has exceeded the recycle threshold 524. The threshold module 522 can request the recycling of the superblock 302. The threshold module 522 can be coupled to the recycle module 526 for performing recycling and wear leveling operations.

The recycle module 526 triggers a recycling event 528. The recycling event 528 is defined as a data preservation operation for moving and erasing data on the erase blocks 304 of the superblock 302. For example, the recycling event 528 can be used as a wear leveling operation that rearranges data across the superblock 302 and another of the superblock 302. The recycling event 528 is for prolonging the life of the erase blocks 304 and for ensuring the integrity of data stored on the erase blocks 304. Data contained in the superblock 302 is copied to another of the superblock 302. The superblock 302 having the re-written data resets the read count 305 and the leakage 307 of the superblock 302.

The trigger count 310 for relative age and retention characteristics is also reset because the read count 305 and the leakage 307 of the erase blocks 304 have been refreshed in another of the superblock 302. During the recycling event 528, the erase blocks 304 with reliability issues such as the bit error count 510 and the program time 511 can be replaced with the erase blocks 304 from spares. The block module 504 can replace the erase blocks 304 in the superblock 302 with reliability issues with other spares of the erase blocks 304. The recycle module 526 can be coupled to the block module 504 and the reset module 530 for sharing information.

The reset module 530 resets the trigger count 310 for the superblock 302 in the metadata table 402. The reset module 530 also updates the write age 306 of the superblock 302 after the recycling event 528. After the recycling event 528, the erase blocks 304 in the superblock 302 will the same value for the read count 305 and for the leakage 307.

The control flow of the memory controller 104 describes the module functions or order as an example. The modules can be partitioned differently. For example, the block module 504, the table module 506, the error module 508, the status module 512, then the condition module 518, the update module 520, the threshold module 522, the recycle module 526, and the reset module 530 can be implemented as one module or with lesser number of modules. Each of the modules can operate individually and independently of the other modules.

The block module 504, the table module 506, the error module 508, the status module 512, the condition module 518, the update module 520, the threshold module 522, the recycle module 526, and the reset module 530 can be hardware implementations in the memory controller 104 or can be implemented as hardware within the electronic system 100 but outside the memory controller 104. The modules of the memory controller 104 can be hardware, software running on or coupled to hardware, or a combination thereof.

It has been discovered that the organization of the superblock 302 by the wear attribute 303 reduces the volume of information tracked by the metadata table 402 and the condition table 308 to manageable levels. The erase blocks 304 organized in the superblock 302 can include blocks having similar relative age, endurance, and retention characteristics. Data management and recycling/wear leveling can occur on the superblock level instead of on the erase block level and the memory storage capacity of the non-volatile memory system can increase without increasing the volume of information that must be tracked.

It has also been discovered that the condition table 308 of the superblock 302 reduces the volume of information that needs to be tracked to manageable levels across power cycles. The condition table 308 can be used to store only the trigger count 310 for the superblock 302 because the trigger count 310 can control when the superblock 302 undergoes the recycling event 528. During the power down 516, one value for the wear attribute 303 can be stored for the superblock 302 instead of individual values for each of the erase blocks 304.

It has further been discovered that the condition table 308 improves data reliability and improves the wear leveling of the non-volatile memory across power cycles. The trigger count 310 of the wear attribute 303 can be stored in the condition table 308 at the power down 516. During the power up 514, the metadata table 402 can be synchronized with the condition table 308 without disturbing the erase blocks 304 within the superblock 302. Information from the condition table 308 can be compared with the recycle threshold 524 and the recycling event 528 can be triggered at initialization of the electronic system 100.

Figure 6:
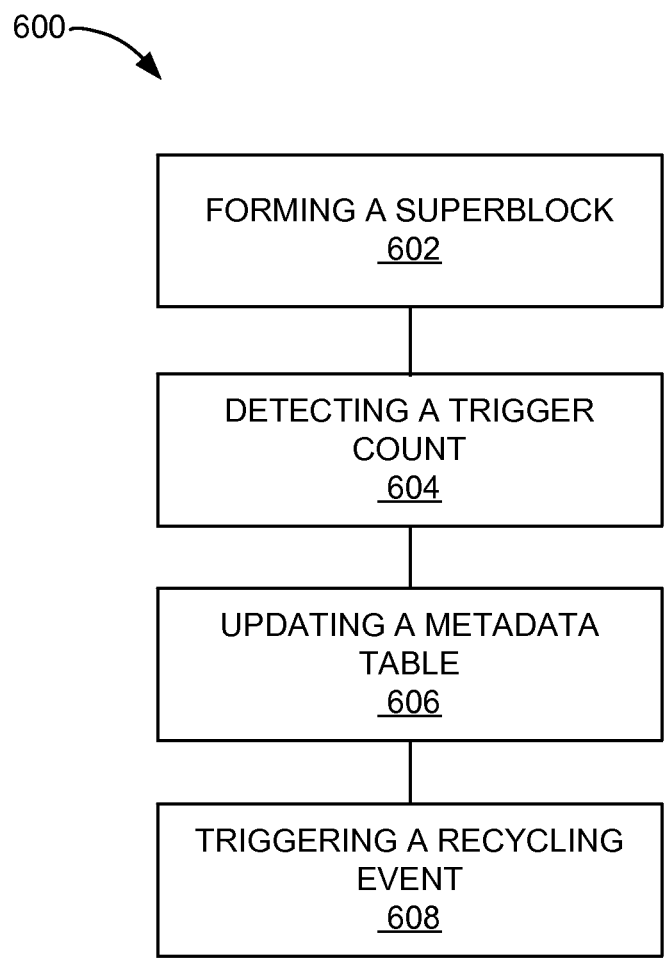
FIG. 6 is a flow chart of a method of operation of the electronic system of FIG. 1 in a further embodiment of the present invention.

Referring now to FIG. 6, therein is shown a flow chart of a method 600 of operation of the electronic system 100 of FIG. 1 in a further embodiment of the present invention. The method 600 includes: forming a superblock by organizing an erase block according to a wear attribute in a block 602; detecting a trigger count of the wear attribute of the superblock in a block 604; updating a metadata table with the trigger count in a block 606; and triggering a recycling event of the superblock based on the metadata table in a block 608.

Thus, it has been discovered that the electronic system 100 of the present invention furnishes important and heretofore unknown and unavailable solutions, capabilities, and functional aspects for an electronic system with read disturb management mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an electronic system comprising:
   forming a plurality of superblocks from a set of erase blocks by organizing the set of erase blocks according to a wear attribute of each of the erase blocks in the set of erase blocks, each superblock comprising a plurality of erase blocks from the set of erase blocks;
   for a respective superblock of the plurality of superblocks:
      detecting a trigger count of the wear attributes of the erase blocks of the respective superblock;
      updating a metadata table with the trigger count; and
      in accordance with the trigger count meeting or exceeding a recycle threshold, triggering a recycling event of the respective superblock.

2. The method as claimed in claim 1 wherein detecting the trigger count of the wear attributes of the erase blocks of the respective superblock includes identifying a read count, a write age, a leakage, or a combination thereof from an erase block of the respective superblock.

3. The method as claimed in claim 1 further comprising generating a condition table for storing the trigger count from the metadata table during a power down.

4. The method as claimed in claim 1, wherein the trigger count is a highest value of the wear attributes of the plurality of erase blocks comprising the respective superblock.

5. The method as claimed in claim 1 further comprising:
detecting the recycling event; and
resetting the trigger count for the respective superblock based on the recycling event.

6. The method as claimed in claim 1, wherein each erase block of the respective superblock has a wear attribute value, and the trigger count is a highest value of the wear attribute for the plurality of erase blocks comprising the respective superblock.

7. The method as claimed in claim 1, including:
detecting a bit error count of the respective superblock;
wherein triggering the recycling event includes triggering the recycling event of the respective superblock in accordance with the bit error count meeting or exceeding the recycle threshold.

8. The method as claimed in claim 1, including:
detecting a program time of the respective superblock;
wherein triggering the recycling event includes triggering the recycling event of the respective superblock in accordance with the program time meeting or exceeding the recycle threshold.

9. The method as claimed in claim 3 further comprising:
detecting a power up; and
updating the metadata table with the condition table during the power up.

10. An electronic system comprising:
a plurality of non-volatile memory devices including a set of erase blocks; and
a memory controller including one or more processors and memory storing software for execution by the one or more processors, the software including:
a block module for forming a plurality of superblocks from a set of erase blocks by organizing the set of erase blocks according to a wear attribute of each of the erase blocks in the set of erase blocks, each superblock comprising a plurality of erase blocks from the set of erase blocks;
a table module, coupled to the block module, for detecting a trigger count of the wear attributes of the erase blocks of a respective superblock of the plurality of superblocks;
an update module, coupled to the table module, for updating a metadata table with the trigger count;
a threshold module, coupled to the table module, for detecting the trigger count meeting or exceeding a recycle threshold; and
a recycle module, coupled to the update module, for triggering a recycling event of the respective superblock in accordance with the trigger count meeting or exceeding the recycle threshold.

11. The system as claimed in claim 10 wherein the table module is for identifying a read count, a write age, a leakage, or a combination thereof from an erase block of the respective superblock.

12. The system as claimed in claim 10 further comprising a condition module, coupled to the table module, for generating a condition table for storing the trigger count from the metadata table during a power down.

13. The system as claimed in claim 10, wherein the trigger count is a highest value of the wear attributes of the plurality of erase blocks comprising the respective superblock.

14. The system as claimed in claim 10 further comprising a reset module, coupled to the recycling module, for resetting the trigger count for the respective superblock based on the recycling event.

15. The system as claimed in claim 10, wherein each erase block of the respective superblock has a wear attribute value, and the trigger count is a highest value of the wear attribute for the plurality of erase blocks comprising the respective superblock.

16. The system as claimed in claim 10,
wherein the threshold module is for detecting a bit error count of the respective superblock; and
wherein the recycle module is for triggering the recycling event of the respective superblock in accordance with the bit error count meeting or exceeding the recycle threshold.

17. The system as claimed in claim 10,
wherein the threshold module is for detecting a program time of the respective superblock; and
wherein the recycle module is for triggering the recycling event of the respective superblock in accordance with the program time meeting or exceeding the recycle threshold.

18. The system as claimed in claim 10 further comprising:
a status module, coupled to the table module, for detecting a power up; and
wherein:
the update module is for updating the metadata table with the condition table during the power up.

* * * * *